United States Patent [19]

Sheem

[11] Patent Number: 4,639,078
[45] Date of Patent: Jan. 27, 1987

[54] OPTICAL FIBER ATTENUATOR AND METHOD OF FABRICATION

[75] Inventor: Sang K. Sheem, Richardson, Tex.

[73] Assignee: Rockwell International Corporation, El Segundo, Calif.

[21] Appl. No.: 658,330

[22] Filed: Oct. 5, 1984

[51] Int. Cl.⁴ ............................................. G02B 6/38
[52] U.S. Cl. ............................... 350/96.21; 350/96.29
[58] Field of Search ............ 350/164, 168, 266, 96.21, 350/96.29, 96.20, 96.30

[56] References Cited

U.S. PATENT DOCUMENTS

| | | | |
|---|---|---|---|
| 3,743,382 | 7/1973 | Rosenberg | 350/266 |
| 4,126,727 | 11/1978 | Kaminski | 350/164 |
| 4,257,674 | 3/1981 | Griffin et al. | 350/96.21 |
| 4,261,640 | 4/1981 | Stankos et al. | 350/96.21 |
| 4,281,925 | 8/1981 | Forrest et al. | 350/96.15 |
| 4,505,539 | 3/1985 | Auracher et al. | 350/96.15 |
| 4,560,238 | 12/1985 | Mori | 350/266 |

Primary Examiner—William L. Sikes
Assistant Examiner—Robert E. Wise
Attorney, Agent, or Firm—V. Lawrence Sewell; H. Fredrick Hamann

[57] ABSTRACT

An optical fiber attenuator is fabricated using an adhesive liquid including submicron light absorbing particles. A portion at the end of a first optical fiber is coated with the liquid. The liquid is spread about the surface of the end of the fiber, as by ultrasonic vibration, to provide a uniform and very thin coat on the fiber. Then the first fiber is spliced at the coated end to an end of a second optical fiber.

2 Claims, 2 Drawing Figures

OPTICAL FIBER ATTENUATOR AND METHOD OF FABRICATION

BACKGROUND OF THE INVENTION

This invention relates to an optical fiber attenuator and the method of making it.

Presently, optical fiber attenuators are particularly expensive. Unfortunately, known simple and inexpensive designs have produced undesirable effects such as modal and interference noise. The present invention is simple and inexpensive to fabricate, but free of these problems.

SUMMARY OF THE INVENTION

In accordance with the present invention, there is provided an optical fiber attenuator fabricated using an adhesive liquid including submicron light absorbing particles. A portion at the end of a first optical fiber is coated with the liquid. The liquid is spread about the surface of the end of the fiber, as by ultrasonic vibration, to provide a uniform and very thin coat on the fiber. The adhesive coat is cured to solidify it. Then the first fiber is spliced at the coated end to an end of a second optical fiber.

DESCRIPTION OF A PREFERRED EMBODIMENT

Figure 1:
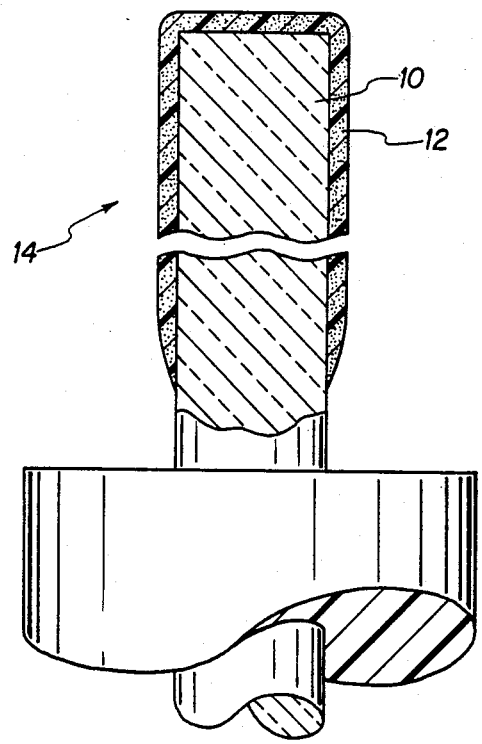
FIG. 1 is a partially sectioned elevation view of a coated optical fiber forming a first part of the attenuator of the invention.

The first step in making the attenuator of the invention is to coat the end of a first optical fiber with a light absorbing liquid that becomes solidified after curing process. FIG. 1 illustrates a fiber 10 with coating 12. The liquid contains an adhesive and light absorbing particles less than a micron in size. This liquid can be, for example, a graphite powder available as a suspension in an ink form. The ink can be diluted if necessary with photoresist, which contains an adhesive. Another adhesive that can be used is epoxy.

The liquid can be applied to the fiber by dipping the fiber tip in the liquid. Then the liquid is uniformly spread about the surface of the fiber tip, as by attaching the fiber to an ultrasonic vibrator. The resulting liquid coating is thin, being five microns thick or less. This coating is baked to cure the adhesive.

After curing, the attenuation provided by the coating is measured by passing a light through the fiber and positioning its coated tip near a detector for measurement of the light from the tip. Fibers exhibiting attenuation out of the desired range are rejected. The amount of attenuation produced by the process of the invention is dependent on density of the light absorbing particles and the thickness of the coating.

Figure 2:
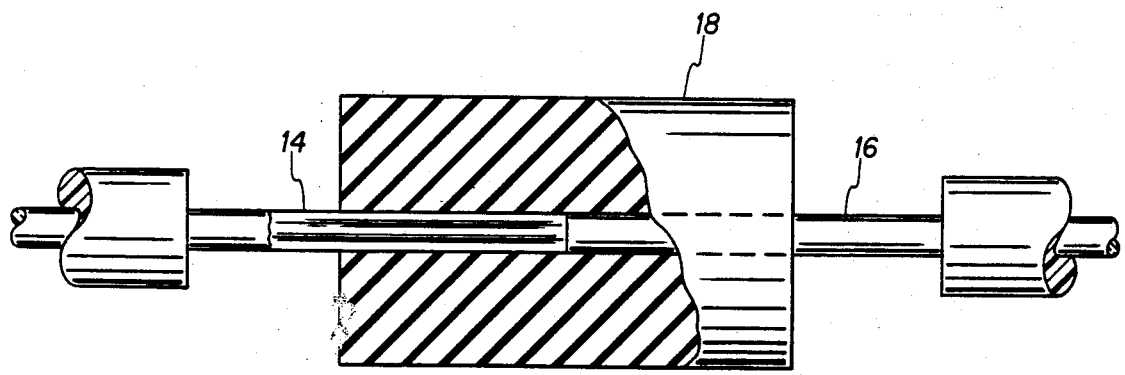
FIG. 2 is a partially sectioned view of a completed attenuator in accordance with the invention.

When it has been determined that the coated fiber, indicated generally by reference numeral 14, exhibits satisfactory attenuation, it is spliced to an uncoated fiber 16, as illustrated in FIG. 2. Two coated fibers may be spliced, in which case the total attenuation is the sum of the attenuation of each. This can be a conventional GTE elastomeric splice, wherein elastomeric element 18 provides fiber alignment, anchoring and housing. The attenuation produced by the light absorbing coating at the end of fiber 14 is the operative element in the completed attenuator of the invention.

The process of the invention is quite inexpensive. Yet, in a specific embodiment of the invention, tests have shown the resulting attenuators to produce very low modal and interference noise due to uniform absorption of light at the end of the fiber.

I claim:

1. The method of making an optical fiber attenuator comprising the steps of:
    coating a portion of a first optical fiber, including an end thereof, with a liquid which includes an adhesive and submicron light absorbing particles;
    ultrasonically spreading said liquid about the surface of said fiber portion so as to achieve a substantially uniform coat of said liquid on said portion;
    curing said coat;
    testing the attenuation provided by said coat; and
    splicing said first fiber at said end to an end of a second optical fiber.

2. The method of making an optical fiber attenuator comprising the steps of:
    coating a portion of a first optical fiber, including an end thereof, with a liquid which includes an adhesive and submicron light absorbing particles;
    ultrasonically spreading said liquid about the surface of said fiber portion so as to achieve a substantially uniform coat of said liquid approximately 5 microns thick or less on said portion;
    curing said coat;
    testing the attenuation provided by said coat; and
    splicing said first fiber at said end to an end of a second optical fiber.

* * * * *